Patented Aug. 5, 1947

2,425,001

UNITED STATES PATENT OFFICE 2,425,001

WINTERIZING VEGETABLE OILS

Fremont P. Parkin and George N. Walker, Minneapolis, Minn., assignors to Minnesota Linseed Oil Paint Company, Minneapolis, Minn., a corporation of Minnesota No Drawing. Application October 11, 1943, Serial No. 505,816

9 Claims. (Cl. 260—428)

This invention relates to methods of purifying natural vegetable seed oils and to the resulting purified products, and more particulary, to methods of purifying linseed oil, cottonseed oil, corn oil and the like, and the resulting purified oils.

Natural vegetable seed oils are composed of mixtures of many naturally produced chemical compounds including not only the oily constituents, but also usually, small percentages of natural phosphatides, vegetable waxes, pigments, and many other compounds. The oily constituents, namely the glyceride esters of long chain fatty acids of the saturated and usaturated types make up the largest fraction of vegetable oils, and such materials, to a large extent, determine the properties of the oil, but the remaining constituents also exert a marked and sometimes detrimental effect, depending upon the use to which the oil is put.

Thus, linseed oil contains as its major constituents the glyceride esters of oleic, linolic and linolenic acid, these being chiefly responsible for the drying property of the oil. In addition, as minor constituents, linseed oil includes natural phosphatides, vegetable waxes, and other factors not yet identified, together with pigmenting constituents, some or all of which apparently are responsible for the tendency of some linseed oils to remain tacky and not dry appropriately.

Natural vegetable oils of commercial grades such as linseed oil, cotton seed oil, soyabean oil, peanut oil and corn oil become cloudy when they are returned to ordinary (room) temperatures, after having been chilled or cooled to somewhat lower temperatures. The cloudiness may be followed by a settling out of an opaque layer, a particularly disadvantageous occurrence when the oil is packaged in glass and where clarity and brightness are of importance.

We have discovered that undesirable minor constituents of natural vegetable oils, such as linseed, soyabean, cottonseed, corn, peanut oils and the like may be removed by convenient economical procedures and that the resultant processed oils are brighter, and resist the formation of cloudiness upon cooling and, in the case of drying and semi-drying types of oils, properties are improved. The oils treated in accordance with this invention are also, generally, somewhat lighter in color, but the specific problem of bleaching the oils may be accomplished by existing bleaching methods. Bleaching procedures do not, however, remove the cloud-forming constituents, and as a result there are many light-colored vegetable oils which become cloudy when they are cooled or chilled and then are allowed to return to normal (room) temperatures. Attempts have heretofore been made to produce "winterized" oils, but as yet there is not available any convenient economical method for so doing, and such "winterized" oils are not available. It is accordingly an object of the invention to overcome the aforesaid disadvantages of existing methods and existing oils and to provide improved oil purifying procedures and to provide new and distinctive purified oils. It is also an object of the invention to provide "winterized" oils and methods of producing them.

We have also discovered that the so removed minor constituents, which are undesirable when present in the oil, are valuable sources of vegetable phosphatides, wax and pigments, and hence constitute valuable by-products. It is accordingly a further object to provide valuable by-products of natural vegetable seed oils.

In carrying out the invention the oil, which may be either a freshly pressed seed oil such as fresh linseed oil, soyabean oil, cottonseed oil, peanut oil or corn oil, is preliminarily chilled to a temperature below 60° F. and preferably to a temperature in the range of 20°–50° F. For linseed, soyabean, corn and peanut oils, we prefer to chill to a temperature in the range of 20°–40° F. whereas for cottonseed oil the preferred range is 40°–50° F. Lower temperatures are not objectionable but are usually commercially impractical from the standpoint of refrigeration cost, and in some cases, because of solidification of the oil, which renders handling difficult.

The time period for the preliminary chilling is variable, depending upon the temperature used, but may be generally defined as the time period necessary for the formation of a cloudy precipitate in the unrefined oil. Thus, when linseed oil is preliminarily chilled to 40° F., a cloud-forming precipitate of minor constituents usually occurs for most linseed oils in about 24–48 hours, whereas when such oils are preliminarily chilled to 50° F. the precipitate occurs in about 4 days to one week. A period of preliminary chilling longer than one week is required at 60° F. and a period shorter than 24 hours, frequently only a few hours, is sufficient where the temperature of the preliminary chilling is 20° F. A preliminary chilling to 40° F. for 48 hours is sufficient for practically all linseed oils and will during such period cause the formation of a cloudy precipitate of the minor constituents. In so far as the time and temperature of the preliminary chilling necessary to cause precipitation to occur is concerned, the behavior of soyabean, corn and peanut oils are practically the same as for linseed oil. Cottonseed oil solidifies at about 40° F. and precipitation occurs before the oil has been chilled to this temperature. Chilling sufficient to cause solidification of the cottonseed oil to occur does no harm, but renders handling difficult. For convenience in pumping and handling, it is preferred that the precipitation of cottonseed oil be accomplished by preliminarily chilling to a temperature below 50° F. but above the solidification point. The time period required for precipitation to occur in cottonseed oil at 50° F. is about the same as required at the same temperature when treating linseed oil.

The temperature and time of the preliminary chilling may thus be generally defined as sufficient to cause the formation of a cloudy precipitate, and more specifically a temperature of less than 60° F., preferably 20° to 50° F., and a time period ranging from a few hours at the lower temperature to several weeks at the higher temperature. The preferred range for linseed, soyabean, corn and peanut oils is 30°–40° F. for a period of about 12 hours at the low temperature to about 48 hours at the higher temperature, the preferred range for cottonseed oil being from the solidification temperature to 50° F. for a period ranging up to several weeks at the higher temperature in the range stated.

After the cloudy precipitate is formed, the oil may be further processed immediately in accordance with this invention or it may be held in storage for as long as necessary or convenient until such further processing, provided the temperature of the oils in storage is kept below about 70° F. We prefer that the temperature be kept below 60° F., but 60°–70° F. and even somewhat higher temperatures are not objectionable if not too long sustained. These temperature and time conditions during storage are to some extent the converse of the pre-chilling, for it is the object to prevent the re-dissolving of the cloud-forming minor precipitate, until it may be removed. The re-dissolving requires a temperature generally somewhat higher and a time period somewhat longer than the temperature and time factors causing precipitation. Thus, the temperature during storage and further processing may rise to 70° F. or even somewhat higher for a few hours before re-dissolving (and consequent disappearance of the cloud-forming precipitate), whereas at lower temperatures, for example below 50°–60° F., the preliminarily chilled oil may be stored for months without any appreciable disappearance of the cloud-forming precipitate. Thus, linseed oil pressed in the wintertime and sent to outside storage lines at a temperature averaging less than 30° F. quickly became sufficiently chilled to cause the cloud-forming precipitate to occur. The thus preliminarily chilled oil was permitted to remain in storage for a period of some months, reaching into the following summer. Due to the winter chilling, the temperature of the oil in storage gradually increased as warm weather continued, but the precipitate remained until after the temperature of the oil had been 65°–70° F. for a period of several weeks.

After the oil is preliminarily chilled so as to cause the formation of the cloud-forming precipitate, it is then further processed by adding thereto from about ½ to about 5% of water or aqueous electrolyte of water and a small percentage of acid, base or inorganic salt. The electrolyte may be dilute acid such as dilute hydrochloric or dilute sulfuric acids, a dilute base such as lime, sodium hydroxide or potassium hydroxide solutions, or a salt solution of for example calcium chloride, sodium chloride or sodium acid sulfate. Ordinary tap water may be used with good results.

The raw, pre-chilled oil and the added water (or electrolyte) are then thoroughly mixed so as to disperse the water or electrolyte throughout the oil. This can be done conveniently by using a high speed propeller mixer, such as a "Lightnin" mixer. The finely dispersed water appears to form a hydrophylic complex of sludge-like consistency with the precipitated cloud-forming minor constituents of the oil. It may be that such constituents are water soluble or at least sufficiently hydrophylic to enter into loose combination with the water molecules.

Thereafter the oil-sludge dispersion is permitted to stand for a short time, 5 to 10 minutes being ordinarily sufficient. Longer standing, for example standing overnight or in storage for some days is not objectionable beyond the delay involved.

After standing the oil-sludge dispersion may then be allowed to separate by standing, but we much prefer to accomplish the separation by the use of a suitable centrifuge equipped for sludge discharge. Where time is of no consideration, the sludge formed by the water (or electrolyte) and the naturally occurring cloud-forming precipitates of the pre-chilled oil will settle, but for easy, certain and rapid separation, it is desirable to use a centrifuge equipped for periodic or continuous sludge discharge. For this purpose the De Laval type AED 1 or Sharples types 600 or D4, suitably equipped for continuous or periodic sludge discharge serve admirably.

The purified oil after settling or after centrifuging contains from .05% to .5% water which may be conveniently removed by atmospheric or vacuum drying, during which it is heated to about 200–220° F. Any other suitable final desiccation procedure such as passing through a bed of dryer salt, such as Dryerite may be used for the removal of the traces of water remaining after settling or centrifuging.

From ½ to 2% water when added to the oil is sufficient to accomplish the purification process, but the resultant sludge when separated is usually of thick consistency. To render the sludge fluid, and thus facilitate drainage from the centrifuge machine, it is frequently desirable to add additional water up to 5%. The addition of water over and above that necessary to combine with the minor constituents and other constituents of the oil to form the sludge, is easily removed by the centrifuge machine followed by drying.

The centrifuged (or settled) and dried oil is bright and clear and resists cloud-formation upon long standing. In the case of linseed oil, the initial starting oil has a yellow color with a slight grey-green tinge and a cloud-precipitate forms upon chilling and then standing at ordinary temperatures as heretofore described. When purified in accordance with the foregoing procedure, the oil loses some of its color and is bright, perfectly transparent, and remains so after many months standing at ordinary temperatures. Furthermore, no cloud-precipitate forms when the oil returns to normal temperatures after it has been chilled to the temperature of melting ice overnight, or even after chilling to solidification temperatures. There is no settling during storage or when packaged, and the entire portion of the oil is accordingly usable in paint and varnish making techniques, whereas heretofore, when linseed oil was allowed to stand in tanks, drums or containers an unusable residue settled therein.

The purified oil product of this invention with or without the final drying to remove the .05% to .5% moisture may be used in place of usual raw linseed oil and may be further refined by usual procedures such as alkali refining, bleaching or the like for the production of special oils.

The sludge recovered from the oil constitutes a valuable by-product containing the natural vegetable phosphatides, vegetable waxes and pigments. In the case of linseed oil, and where the sludge is separated by centrifugal methods, the sludge is a greyish-green, soft, somewhat jelly-like mass having a viscosity such that it will run at room temperatures 65°–70° F. It may be dehydrated by vacuum desiccation to remove some or all of the contained water, as desired, and serves as a starting material for the preparation of purified constituents of the sludge.

The vegetable oils purified in accordance with the foregoing methods are appreciably less hydrophylic than the corresponding unpurified oils. Thus, linseed oil, purified as herein described, when worked up as paint or varnish, exhibits remarkably improved resistance to water absorption. A paint or varnish compounded of linseed oil purified in accordance with the invention is resistant to water absorption and resultant tackiness and dries harder and quicker and with higher gloss than when oil, not so purified, is used. This is probably due to the fact that the hydrophylic compounds, including phosphatides, vegetable waxes and pigments were removed and hence do not serve to invite the absorption of water in the film. Cottonseed oil, purified in accordance with the invention, is bright and remains perfectly clear for long periods during storage, particularly when stored under cool or chilled conditions. The color of the oil (as distinguished from cloudiness) depends upon the bleaching treatment given the oil. Thus, oils may be bleached successfully, but the cloud-forming propensity depends upon whether or not the oils have been treated as herein provided. Cottonseed oil treated in accordance with this invention resists the formation of cloudiness when chilled and then allowed to resume room temperatures. The resultant "winterized" cottonseed oil is admirably suitable for human consumption as salad oil and the like. In cottonseed oil of the prior art, a precipitate forms and settles unless the oil has been subjected to an expensive "winterizing" process. Cloud formation in cottonseed oil is particularly objectionable because the oil is edible and is frequently packaged in glass, where the precipitate is easily visible to the user.

Corn oil, peanut oil, soyabean oil and other vegetable seed, nut and fruit oils are similarly benefited. The following examples will serve to illustrate the invention, but are not to be construed as limitations thereon.

*Example I*

Raw linseed oil, fresh from the oil pressing operation, was filtered through canvas to remove entrained solids and was then pumped to be stored in an outside tank. The season was winter in Minnesota, U. S. A., and the minimum temperature to which the oil was preliminarily chilled was between 20° and 30° F. The oil was in outside storage tanks for two months and the temperature varied somewhat during the storage period before further processing, but at no time did the temperature exceed 40° F. A cloudy precipitate, characteristic of raw, chilled linseed oil soon formed in the oil. The temperature of the oil was about 40° F. when it was taken from the outside storage tanks for further processing.

Eight hundred (800) pounds of the aforesaid pre-chilled oil was pumped into a supply tank, and 16 pounds of water (2%) were added gradually while stirring with a high speed propeller type mixer (viz. a "Lightnin" mixer). The stirring was continued for 15 minutes and resulted in a smooth emulsion of water and oil. A sample was taken and the emulsion was found to "break out" in a few minutes. It may be explained that the "breakout" indication is when a precipitate coagulates as discrete particles from the smooth emulsion. When the breakout occurs, it indicates that a sufficient agitation has been achieved, and one may proceed with the emulsion separation.

The oil-water emulsion was then sent through a Sharples centrifuge, type 600, equipped with a No. 30 ring dam and equipped for continuous sludge discharge. The centrifuge was started and primed and the linseed oil-water emulsion was then sent through the centrifuge.

The oil leaving the centrifuge was heated to 200–220° F. for three-quarters of an hour during which time the oil was agitated. This served to drive off a small percentage of water that remained in the oil after centrifuging.

The oil was tested (1) in its untreated condition, prior to any processing, (2) after centrifuging and (3) after centrifuging and drying, to determine the percentage of total volatiles and the percentage of acetone insoluble material under hot and cold conditions (A. S. T. M. foots test). The results of these tests were as follows:

| | Total Volatiles | A. S. T. M. Foots Test | |
|---|---|---|---|
| | | Hot | Cold |
| | Per cent | Per cent | Per cent |
| Untreated Oil Starting Material | .05 | .8 | 1.2 |
| Processed Oil after Centrifuging | .3 | .2 | .2 |
| Processed Oil after Centrifuging and Drying | Trace | Trace | Trace |

The untreated oil (i. e. the starting material) had the characteristic yellow, grey-green color of untreated linseed oil and after chilling and allowing to resume room temperature, it had a cloudy precipitate therein. After processing in accordance with this invention, the oil was lighter in color and had lost most of the greenish tinge. It was brighter and even remained clear upon standing many months during which time no sediment developed in the container. It failed to develop any precipitate or sediment when allowed to return to room temperature after having been held at the temperature of melting ice. Paints and oils made from the oil were superior in regard to water absorption, tackiness, rapidity of drying and hardness of the resulting film than paints and varnishes compounded from identical oils which had not been so processed.

The sludge discharged from the centrifuge was a greyish-green color and had a soft, semi jelly-like consistency at the discharge of the centrifuge. It contained considerable water and was dried by vacuum desiccation at 165° F. and about 1 inch mercury pressure. When dried the product is a semi-solid, dark greenish-brown mass. It contains vegetable waxes, phosphatides, pigments and possibly other constituents.

Example II

Cottonseed oil of commercial grade was preliminarily cooled to 40° F. at which temperature the oil solidified slightly into a semi-solid condition. Four per cent water was then added and thoroughly stirred into the oil, using a high speed mixer, as in Example I, the stirring being continued for about 10 minutes until an emulsion of the oil and the added water was formed. The oil-water emulsion was then allowed to set 10 minutes and was then centrifuged, as described with reference to Example I. The oil had a temperature of about 45° F. when it was sent through the centrifuge and at this temperature was in a completely liquid condition. The sludge discharged from the centrifuge was dark brown and the oil discharged was cloudy, due to traces of moisture remaining in the oil after centrifuging. The centrifuged oil was then dried by heating to a temperature of 200–220° F. while thoroughly agitating, during which the residual moisture was driven off. A sample of the treated and dried oil was chilled until solid and was then permitted to resume room temperature, at which temperature the oil remained perfectly clear.

Example III

Commercial soyabean oil was cooled to 25° F. and at that time 3% water was added and the oil and water were thoroughly mixed for ten minutes with a high speed mixer, as in Example I, until an emulsion of the water and the oil was formed. The mixture was then allowed to stand for ten minutes and was then centrifuged as in Example I. A heavy cream-colored sludge was discharged from the centrifuge. The oil discharged from the centrifuge was then dried, as in Example I, by heating to 200–220° F. while thoroughly agitating. A sample of the treated and dried oil did not become cloudy when kept in an ice bath overnight and then allowed to return to room temperatures.

Example IV

Peanut oil was cooled to 30° F. and was allowed to stand overnight whereupon 2% of water was added and the water and oil stirred for ten minutes with a high speed mixer, as in Example I, until an emulsion of the water in the oil was obtained. The water-oil emulsion was then passed through a centrifuge as in Example I, the temperature of the emulsion being 40–45° F. at the time of centrifuging. The sludge discharged from the centrifuge was white in color, and the oil, after being freed from moisture by heating to 200–220° F. with agitation, remained perfectly clear after chilling to 30° F. and then being allowed to return to room temperature.

Example V

Corn oil was cooled to a temperature of 30° F. and allowed to stand overnight whereupon 4% moisture was added and thoroughly stirred into the oil by rapid agitation for ten minutes with a rapidly revolving stirrer, as in Example I. The oil-water emulsion was then permitted to stand for ten minutes and then was passed through a centrifuge, as in Example I, the temperature of the emulsion being 40° F. at the time of centrifuging. A white sludge was discharged from the centrifuge and the discharged oil was dried, as in Example I, by heating to a temperature of 200–220° F. while thoroughly agitating. A sample of the treated and dried oil was chilled until solid and then was allowed to resume room temperature, at which temperature the oil remained perfectly clear.

Example VI

Eight hundred (800) pounds linseed oil having a temperature of 53° F. were thoroughly admixed with a solution of 18 pounds of water containing 2 pounds of calcium chloride. The oil and water solution of calcium chloride was thoroughly mixed by stirring with a high speed stirrer for 30 minutes, as in Example I. The emulsion was allowed to stand for a short time and was then centrifuged, as in Example I, and the oil discharged from the centrifuge, was dried by heating to a temperature of 200–220° F. while being rapidly stirred. The oil was tested according to the standard A. S. T. M. foots test and showed only a trace when tested under either the hot or the cold procedure.

Example VII

To 800 pounds of linseed oil having a temperature of 55° F. there were added 40 pounds of water having dissolved therein one pound of calcium chloride and 1 pound 9 ounces of concentrated hydrochloric acid (sp. gr. 1.18). The oil-water mixture was thoroughly stirred for 30 minutes, as in Example I, using a rapid stirring machine and after being permitted to stand the oil-water emulsion was passed through the centrifuge machine, as in Example I. The resultant product was dried by heating for three-quarters of an hour to a temperature of 200–220° F. while agitating. The purified oil was tested in accordance with the standard A. S. T. M. foots test and showed only traces when tested in accordance with the hot and cold procedures.

As many apparently widely different embodiments of this invention may be made without departing from the spirit and scope thereof, it is to be understood that we do not limit ourselves to the specific embodiments herein except as defined by the appended claims.

We claim as our invention:

1. The process of purifying natural, vegetable oils for simultaneously removing the hydrophilic and waxy components thereof which comprises pre-chilling the oil to a temperature below 60° F. for a period sufficient to cause a cloudy precipitate to form therein when a sample of the oil is permitted to resume a normal temperature, maintaining the thus chilled oil at a temperature sufficiently low so that the cloudy precipitate does not redissolve in the oil, thereafter adding ½ to 5% of water to the oil, thoroughly admixing the oil and water and centrifuging the oil to separate the resultant sludge.

2. The process of purifying natural, vegetable oils for simultaneously removing the hydrophilic and waxy components thereof which comprises pre-chilling the oil to a temperature below 60° F. until a cloudy precipitate forms when a sample of the oil is permitted to resume a normal temperature, maintaining the temperature of the oil below substantially 70° F. so that said precipitate does not redissolve in the oil, then while the precipitate is still present in the oil; adding ½ to 5% water to the oil, mixing the oil and water addition thoroughly and centrifuging the oil to separate the thus formed sludge.

3. The process of purifying a natural vegetable oil for simultaneously removing the hydrophilic and waxy components therefrom which comprises preliminarily chilling said oil to a temperature below 60° F. for a period sufficient to cause a cloudy precipitate to form therein, maintaining the temperature of said oil below about 70° F. so that said precipitate does not redissolve in the oil, then while said precipitate is still present in the oil adding ½% to 5% water thereto, thoroughly mixing the water and oil to form a sludge of the added water and material constituting said cloudy precipitate and separating said sludge from the oil.

4. The process of purifying natural vegetable oils for simultaneously removing hydrophilic and waxy components thereof which comprises prechilling the oil to a temperature below 60° F. until a cloudy precipitate forms therein when a sample of the oil is permitted to resume a normal temperature, maintaining the temperature below about 70° F. so that the precipitate does not redissolve in the oil, then while the precipitate is still present in the oil thoroughly admixing ½ to 5% water with the oil and centrifuging the oil to separate the thus formed sludge, and then drying the oil with heat to remove traces of water.

5. The process of purifying natural, vegetable oils for simultaneously removing hydrophilic and waxy components thereof which comprises initially chilling the oil to a temperature in the range of 20° F. to 50° F. until a cloudy precipitate forms in the oil, then while the precipitate is still present in the oil adding water in an amount ranging from ½ to 5% by weight of the oil, thoroughly admixing the oil and water, and then centrifuging the mixture to separate the thus formed sludge, the temperature of the oil being maintained below 70° F. throughout the process after the initial chilling.

6. The process of purifying natural, vegetable oils for simultaneously removing hydrophilic and waxy components thereof which comprises initially chilling the oil to a temperature in the range of 20° F. to 50° F. until a cloudy precipitate forms in the oil, then while said precipitate is still present adding aqueous electrolyte in an amount ranging from ½ to 5% by weight of the oil, thoroughly admixing the oil and aqueous electrolyte and then centrifuging the mixture to separate the thus formed sludge, the temperature of the oil being maintained below 70° F. throughout the process after the initial chilling.

7. The process of purifying a natural vegetable oil for simultaneously removing hydrophilic and waxy components thereof which comprises initially chilling the oil to a temperature in the range of 20° F. to 50° F. until a cloudy precipitate forms therein, then while said precipitate is still present adding water to the oil in an amount ranging from ½ to 5% by weight of the oil, thoroughly admixing the oil and water so as to form a sludge and then centrifuging the mixture to separate the thus formed sludge, the temperature of the oil being maintained below 70° F. throughout the process after the initial chilling and then drying the oil with heat to drive off residual traces of moisture.

8. The process of purifying linseed oil for simultaneous removal of hydrophilic and waxy components thereof which comprises preliminarily chilling said oil to a temperature in the range of 20° F. to 50° F. until the oil becomes cloudy due to the precipitation of natural vegetable constituents of the oil, then while said precipitate is still present adding an aqueous liquid containing water in the amount of ½ to 5% by weight, based upon the weight of the oil, thoroughly admixing the aqueous liquid and oil so as to form a sludge in the oil, and centrifuging the oil-sludge mixture to separate the sludge therefrom, the temperature of the oil and oil-sludge mixture being maintained below about 70° F. throughout the process after the preliminary chilling.

9. The process of purifying linseed oil for simultaneous removal of hydrophilic and waxy components thereof which comprises preliminarily chilling linseed oil to a temperature in the range of 20° F. to 50° F. until the oil becomes cloudy due to the precipitation of natural vegetable constituents of the oil, adding an aqueous liquid containing water in the amount of ½ to 5% by weight, based upon the weight of the oil, thoroughly admixing the aqueous liquid and oil so as to form a sludge in the oil, centrifuging the oil-sludge mixture to separate the sludge therefrom, the temperature of the oil and oil-sludge mixture being maintained below about 70° F. throughout the process after the preliminary chilling, and finally drying the so purified oil to remove traces of water remaining after centrifuging.

FREMONT P. PARKIN.
GEORGE N. WALKER.

REFERENCES CITED

The following references are of record in the file of this patent:

UNITED STATES PATENTS

| Number | Name | Date |
| --- | --- | --- |
| 1,381,705 | Hapgood | June 14, 1921 |

FOREIGN PATENTS

| Number | Country | Date |
| --- | --- | --- |
| 341,390 | Great Britain | Jan. 5, 1931 |
| 275,536 | Great Britain | Aug. 25, 1927 |

OTHER REFERENCES

Lewkowitsch, "Chemical Technology and Analysis of Oils, Fats and Waxes," ed. 6, vol. 2, pages 30 and 31. Published by MacMillan, London, 1922.

Dean, "Utilization of Fats," page 170. Published by Harvey, London, 1938.